(12) United States Patent
Meierhans et al.

(10) Patent No.: US 9,273,739 B2
(45) Date of Patent: Mar. 1, 2016

(54) BRAKE SYSTEM

(71) Applicant: INVENTIO AG, Hergiswil NW (CH)

(72) Inventors: Daniel Meierhans, Lucerne (CH);
Faruk Osmanbasic, Cham (CH); Julian Stahli, Lucerne (CH); Kurt Infanger, Dierikon (CH); Roland Rothenfluh, Obernau (CH)

(73) Assignee: Inventio AG, Hergiswil (CH)

( * ) Notice: Subject to any disclaimer, the term of this patent is extended or adjusted under 35 U.S.C. 154(b) by 174 days.

(21) Appl. No.: 13/768,260

(22) Filed: Feb. 15, 2013

(65) Prior Publication Data

US 2013/0213750 A1    Aug. 22, 2013

(30) Foreign Application Priority Data

Feb. 17, 2012    (EP) .................................... 12155870

(51) Int. Cl.
  *F16D 65/06*    (2006.01)
  *F16D 65/00*    (2006.01)
  *B66B 5/16*    (2006.01)
  *B66B 5/22*    (2006.01)

(52) U.S. Cl.
CPC . *F16D 65/06* (2013.01); *B66B 5/16* (2013.01); *B66B 5/22* (2013.01); *F16D 65/00* (2013.01)

(58) Field of Classification Search
CPC ................................. F16D 65/78; F16D 65/00
USPC ....... 188/264 D, 264 R, 264 B, 264 E, 153 R, 188/151 R, 41, 264 P; 187/376; 184/3.1, 6.1
See application file for complete search history.

(56) References Cited

U.S. PATENT DOCUMENTS

| | | | | |
|---|---|---|---|---|
| 1,883,515 A * | 10/1932 | Brady | ............................. | 184/21 |
| 1,948,747 A * | 2/1934 | Dunlop | ........................... | 184/37 |
| 2,435,742 A * | 2/1948 | Gaither | ......................... | 187/409 |
| 2,489,182 A * | 11/1949 | Huck | ............................. | 184/3.1 |
| 2,963,118 A * | 12/1960 | Booth et al. | ................... | 188/274 |
| 3,838,752 A * | 10/1974 | Berkovitz | ......................... | 7/266 |
| 4,014,413 A * | 3/1977 | Monks | .......................... | 188/170 |
| 5,495,927 A * | 3/1996 | Samie et al. | ................ | 192/70.12 |
| 6,419,054 B1 * | 7/2002 | Schulba | ....................... | 188/71.6 |
| 2002/0117357 A1 | 8/2002 | Hugel | | |
| 2003/0188937 A1 * | 10/2003 | Schneider et al. | ......... | 188/264 F |
| 2004/0134727 A1 | 7/2004 | Windlin | | |
| 2011/0214952 A1 * | 9/2011 | Fujino et al. | .............. | 188/264 B |

FOREIGN PATENT DOCUMENTS

| | | | |
|---|---|---|---|
| EP | 1433736 A1 | 6/2004 | |
| EP | 2399858 A1 | 12/2011 | |
| JP | 55074982 A | * | 6/1980 |
| JP | 57139184 A | * | 8/1982 |

* cited by examiner

*Primary Examiner* — Melanie Torres Williams
(74) *Attorney, Agent, or Firm* — Fraser Clemens Martin & Miller LLC; William J. Clemens

(57) ABSTRACT

A brake system of an elevator, an escalator or a moving walkway includes a brake device with at least one brake shoe. The brake shoe has an effective surface which during brake use is pressed against a friction surface, which is moving or movable relative to the effective surface, of a counter-member. The brake system also includes a feed device which is supplied by a fluid source. A fluid can be fed between the effective surface of the brake shoe and the friction surface, which faces it, by means of the feed device. The friction between the effective surface and the friction surface can be influenced by the feed of the fluid.

20 Claims, 5 Drawing Sheets

BRAKE SYSTEM

CROSS-REFERENCE TO RELATED APPLICATION

This application claims priority to European Patent App. No. 12155870.4, filed Feb. 17, 2012, which is incorporated herein by reference.

FIELD

The present disclosure relates to a brake system of an elevator, an escalator or a moving walkway.

BACKGROUND

Operating brakes serve for holding an elevator cage of an elevator or holding a step belt of an escalator in a specific position. They can also be used for retarding a moved elevator cage or a moved step belt. In cases of emergency such as, for example, in the case of power failure the brake systems are designed so that they brake with "maximum braking force." The maximum braking force is fixed in relevant standards. Operating brakes are usually electromechanical brake systems. The at least one brake thereof is pressed by means of spring elements against the friction surface, which is to be braked, of a brake disc, a brake drum or a support means (cable or belt). For release of the brake use is made of an electromagnet which is suitable for overcoming the spring force of the spring elements. The foregoing explanations can also apply analogously to moving walkways with a plate belt.

Even when the brake shoe is pressed by the effective surface thereof against the friction surface by a constant spring force the friction resulting therefrom and thus the deceleration during the braking process substantially change. Influences such as the temperature during the brake use, contamination of the effective surface and the friction surface, changes in the surface thereof and in the structure due to preceding use of the brake and the like lead to a strongly fluctuating braking performance. This can lead to unsatisfactory braking behavior, which due to the selected setting of the brake can represent a compromise between the bandwidth of the attainable braking travel and the maximum reasonable placing of load on the user.

Safety brakes are triggered usually only in cases of emergency and have the task of fixing moved components, such as an elevator cage, counterweight, a step belt or a plate belt, as rapidly as possible. Safety brakes can be arranged at the elevator cage and/or at the counterweight or act on a support means connecting the elevator cage with the counterweight. Triggering of a braking process takes place through an electrical or mechanical signal of a speed limiter. In elevator standards passed by regulators, deceleration values or negative acceleration values of the elevator cage, which are not to be exceeded, are stipulated for braking processes. Very high negative acceleration values usually arise between the friction surface and the effective surface shortly before transition from a sliding friction to an adhesive friction. The negative acceleration values usually run progressively in an unfavorable manner. A constant deceleration value of, for example, $-3$ m/s$^2$ could be perceived as significantly unpleasant.

SUMMARY

In some embodiments, a brake system includes a brake device with at least one brake shoe. The brake shoe has an effective surface which during brake use is pressed against a friction surface, which is moving or movable relative to the effective surface, of a counter-member. Such brake systems can be used as operating brakes (e.g., shoe brake, disc brake, cable brake) or as a safety brake (e.g., catch brake).

At least some embodiments comprise a brake system which is economic and which makes the friction present between the effective surface and the friction surface in the case of braking manageable.

In some embodiments, a brake system of an elevator, an escalator or a moving walkway includes a brake device with at least one brake shoe. The brake shoe has an effective surface, which during brake use is pressed against a friction surface, which is moving or movable relative to the effective surface, of a counter-member. The brake system further comprises a feed device which is supplied by a fluid source. A fluid can be fed between the effective surface of the brake shoe and the friction surface facing it by means of the feed device. The friction between the effective surface and the friction surface can be influenced by the feed of the fluid.

The feature "friction" in the present specification embraces external kinds of friction between mutually contacting boundary surfaces of solid bodies, internal friction of fluids and mixed forms of friction. Belonging to external forms of friction are adhesive friction, sliding friction, roll friction, rolling friction, bore friction and cable friction. Apart from movement of particles in a material, internal friction also describes the frictional resistance of bodies moving in fluids. In external friction, surfaces sliding on one another are in mutual contact. In that case, surface elevations are leveled (abrasion or wear). External friction arises, for example, when no lubricant is used or the lubrication fails. Mixed friction can occur in the case of insufficient lubrication or at the start of movement of two friction partners with lubrication. In that case, the slide surfaces are in punctiform contact. Pure internal friction, also termed fluid friction, arises when a permanent lubricating film forms between the slide surfaces. Typical lubricants are fluids such as oil, water and also gases. In the case of pure fluid friction the slide surfaces are completely separate from one another.

During brake use kinetic energy is converted over a specific time segment into heat. In order to achieve, for example, a constant deceleration, the friction between the friction surface and the effective surface can be reduced towards the end of the brake use. Due to the feed of fluid the components of external friction and fluid friction in the mixed friction occurring between the friction surface and the effective surface can be varied during the entire brake use.

Even if the feed of a fluid during the braking process might appear paradoxical for reducing friction, a predetermined brake travel with a predetermined deceleration profile or speed profile can be maintained generally very accurately by the present brake system. The proposed brake system does not in any way impair safety, since in the case of failure of the fluid feed the brake acts in conventional mode and manner. This can reduce comfort for users of passenger conveying equipment during a braking process, but does not place them at risk of life and limb. Moreover, the fluid feed makes possible a partial cooling of the brake shoes so that this and the counter-member have a longer service life. In addition, a lower output of noise during the braking process is to be expected.

The deceleration profile defines in the travel/speed diagram the predetermined reduction in speed over the entire braking travel. The deceleration is to be perceived as being agreeable as possible by the users in the elevator cage. In order to make the transition from sliding friction to adhesive friction tolerable, a predetermined amount of fluid can, for example, be fed directly before the stop. This possibility also offers possible advantages in the closing phase of a braking process with an elevator cage to be moved to a specific position, for example that at the next story to be reached. Through a precisely metered feed, the brake travel can be prolonged until the floor of the elevator cage is at the same level as the floor of the story.

The feed device can be of different designs. One embodiment of the feed device includes at least one passage formed in the brake shoe. The passage has an inlet and an outlet, which opens in the effective surface. The inlet is connected with the fluid source, wherein a sufficient fluid pressure is producible by the fluid source in order to feed the fluid between the friction surface and effective surface pressed against one another. The requisite fluid pressure is dependent on the cross-section of the outlet and on the force by which the effective surface of the brake shoe is pressed against the friction surface of the counter-member.

Moreover, the effective surface of the brake shoe can have bores and/or grooves. This serves for the feed of cooling air and the discharge of dirt and fluid. In order that the supplied fluid does not ineffectively seep into the bores and/or grooves, the outlet of the at least one passage can open in the effective surface between the bores and/or grooves.

As explained further above the brake shoe can have one or more passages. In order, in the case of presence of several passages, to restrict the number of supply lines between the fluid source and the brake shoe to a minimum the brake shoe can have at least two passages, which open in its effective surface and the inlets of which are connected with the fluid source by a common supply line.

In other embodiments the feed device can comprise at least one inlet region, which is formed at the brake shoe, and at least one opening, which is directed towards this inlet region, of a feed line. The feed line is connected with the liquid source. A fluid of the fluid source can be fed through the opening to the inlet region. The inlet region has a suitable form, for example a curved surface. As a consequence of relative movement of the friction surface with respect to the effective surface the fluid can, starting from the inlet region and a fluid wedge forming between the effective surface and the friction surface, pass between the friction surface and effective surface pressed against one another.

The fluid source can be a conveying device, possibly a pump, which sucks the fluid from a reservoir and conveys it to the feed device. A pressure cylinder can also be used, the spring-loaded piston of which presses on a fluid enclosed in the cylinder space. In addition, the fluid source can comprise a gas pressure container which either contains the fluid or makes available the necessary conveying pressure in a pressure-resistant fluid tank. The brake system can comprise, for regulation of the feed of the fluid, a control valve and a control acting on the control valve. In order to ensure a feed which is as precise as possible the control valve is possibly arranged in the feed device directly in front of the opening of the feed line or the outlet of the passage. The control valve can also be arranged in the fluid source.

Moreover, the brake system can comprise a sensor by which a change in the relative movement of the friction surface with respect to the effective surface is detectable. This sensor can be an acceleration sensor, a radar sensor, a speed sensor or the like. The output signal of the sensor can be transmitted to the control. The control can use this output signal, with consideration of stored operating data, for calculation of at least one ideal time segment of the feed and the mass of fluid to be conveyed at this time segment in order, for example, to provide the predetermined deceleration profile mentioned further above.

In order to provide the predetermined deceleration profile it is possibly necessary to feed fluid between the effective surface and the friction surface during a plurality of successive time segments. By virtue of the control signals of the control the control valve can also generate a pulsating fluid flow.

In the present brake system use can be made of different fluids. Technical gases such as, for example, compressed air or nitrogen are usable. The fluid can, however, also be a liquid, for example a mineral oil with or without additives. In tests, for example, mineral oils without high-pressure additives such as wear-reducing agents, friction-reducing agents and/or anti-fret additives were successfully used. The mineral oil can in addition have additives such as flame inhibitors in order in the case of fire to prevent or dampen ignition of the supplied fluid. Use of water is also possible if no corrosion damage is thereby caused to the components of the elevator, escalator or moving walkway. In addition, fine-grained solids such as, for example, quartz sand can be used as fluid. The use of a mineral oil without additives such as wear-reducing agents, friction-reducing agents and/or anti-fret additives can mean that the counter-member, for example a guide rail of an elevator, is newly lubricated as a consequence of brake use. A mineral oil without the mentioned additives can mean that the liquid film between the effective surface and the friction surface soon breaks down when the feed of fresh fluid is interrupted.

As already mentioned further above the brake system can be an operating brake, wherein the counter-member thereof can be a brake drum or a brake disc. In the case of operating brakes it can be ensured that the fluid used is discharged from the region of the operating brake so that this does not build up in the region of the effective surface and friction surface and negatively influence braking behavior.

The brake system can, however, also be a safety brake or catch device or catch brake which can brake at a counter-member. The counter-member can be a guide rail or a separately arranged brake rail.

The already present fluid source can also supply fluid for further, brake-assisting tasks. Elevators, escalators and moving walkways are used throughout the world and are therefore subject to the most diverse operating conditions. In particular, dust and dirt can adhere to the counter-member and impair the performance capability of the brake system. In order to remove dirt, the brake system can comprise at least one fluid-supplied cleaning device which is mounted upstream of the brake shoe and serves for cleaning of the counter-member. The cleaning device can also have an own fluid source.

Different braking methods can be performed for braking an elevator cage of an elevator, a step belt of an escalator or a plate belt of a moving walkway by the afore-described brake system.

Various embodiments of these methods comprise the step, during brake use of the brake system, of feeding a predetermined amount of a fluid via the passage of the brake shoe or via the opening and the inlet region between the effective surface and the friction surface at least once by the feed device in order to influence the friction between the effective surface of the brake shoe and the friction surface facing it. This step does not necessarily require a control, since the predetermined amount can also be measured by mechanical means such as, for example, by the cylinder volume of a piston pump.

At least some disclosed method embodiments can also be supplemented by further method steps, possibly when the brake system has a control with at least one computer unit and with at least one memory unit. In a further step, time-dependent characteristic data of brake use such as temperature, fluid pressure, deceleration values and/or acceleration values can be stored together with time information in the memory unit. Control variables for the next brake use can subsequently be calculated from these characteristic data.

BRIEF DESCRIPTION OF THE DRAWINGS

The construction of a brake system as well as possibilities of use thereof in an elevator, an escalator or a moving walkway are explained in more detail in the following with reference to the drawings, in which.

DETAILED DESCRIPTION

Figure 1:
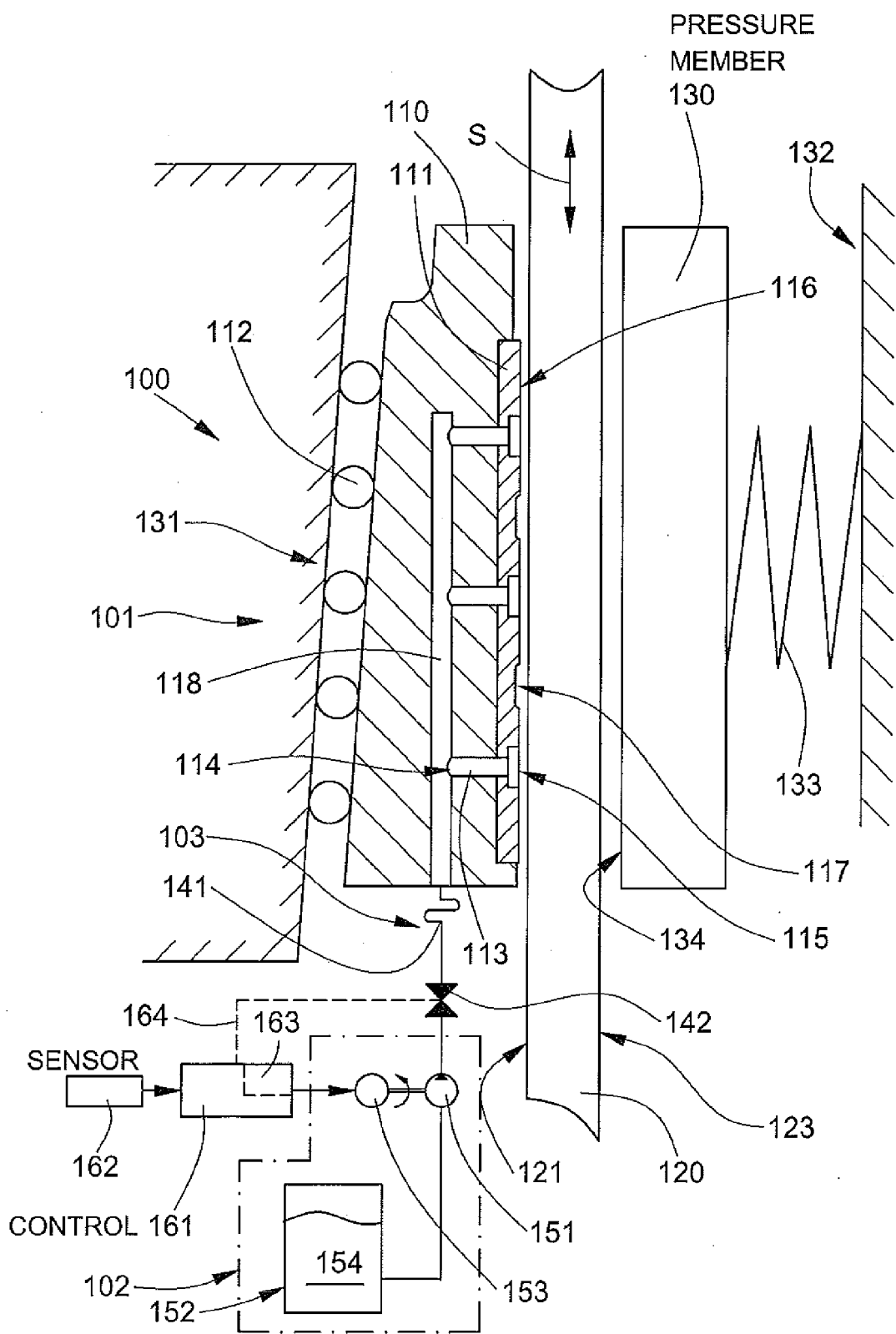
FIG. 1 shows, schematically, in plan view a brake system, which is designed as a safety brake, in a first embodiment, wherein the brake system comprises a brake device, a fluid source and a feed device and the brake device includes a brake shoe and a resiliently mounted pressure member.

FIG. 1 shows schematically and in sectional plan view a brake system 100, which is designed as a safety brake, in a first embodiment. The brake system 100 comprises a brake device 101 which includes a brake housing, a brake shoe 111 mounted in the brake housing to be linearly displaceable, and a pressure member 130 resiliently mounted in the brake housing. A counter-member 120 is arranged between the brake shoe 111 and the pressure member 130. During brake use of the brake device 101 the pressure member 130 and the brake shoe 111 bear against the counter-member 120. When no brake use takes place, sufficient play is present between the counter-member 120 and the brake shoe 111 on the one hand and between the counter-member 120 and the pressure member 130 on the other hand, as is illustrated in FIG. 1.

For the sake of better clarity, of the brake housing only a brake housing wall 131 arranged at an inclination to the counter-member 120 and a brake housing wall 132 arranged parallel to the counter-member 120 are illustrated. The two housing walls 131 and 132 are fixedly connected together and the brake housing is fastened to an elevator cage (not illustrated), which is movable parallel and relative to the counter-member 120 in the indicated arrow direction S. A wedge body 110 is linearly guided at the first brake housing wall 131 by means of a wedge guide 112. The wedge guide 112 is, by way of example, illustrated as a roller guide, but sliding guides can also be used. The brake shoe 111 is fastened to the wedge body 110 and the effective surface 116 of the brake shoe is directed towards a friction surface 121 of the counter-member 120. The counter-member 120 can be a guide rail of the elevator cage (not illustrated). However, it is also conceivable for the counter-member 120 to be a brake rail separately arranged in the elevator shaft.

Through a linear displacement of the wedge body 110 and the brake shoe 111 along the inclined brake housing wall 131 a displacement of the effective surface 116 relative to the friction surface 121 takes place until these contact one another. Due to the wedging action of the wedge body 110, the effective surface 116 is pressed with high pressing pressure against the friction surface 121 and in the case of relative movement of the effective surface 116 with respect to the friction surface 121 produces a braking force. If no relative movement is present, a holding force, which can hold the mass of the elevator cage, acts. In order that the counter-member 120 can deviate only to a limited extent as a consequence of the acting pressing force, the pressing force acts against the pressure member 130, which resiliently mounted by a spring element 133. In addition, the pressing force is limited by the spring element 133.

The brake shoe can, as illustrated in FIG. 1, have an effective surface 116 with grooves 117. In some cases, bores can also be present instead of the grooves 117. The brake shoe 111 additionally has a plurality of passages 113, which extend in the wedge body 110. The passages 113 have outlets 115 which open in the effective surface 116. Since the passages 113 extend in the wedge body 110 the inlets 114 thereof are also arranged in the wedge body 110. The inlets 114 are connected together by means of a common supply duct 118.

The supply duct 118, which is part of a feed device 103, is similarly formed in the wedge body 110. The feed device 103 further comprises a flexible line 141 and a valve 142, wherein the flexible line 141 connects the supply line 118 with the valve 142. The valve 142 is connected with a fluid source 102, which essentially comprises a pump 151, a fluid reservoir 152 and a pump motor 153 which drives the pump 151.

In the first embodiment the fluid 154 is a liquid, for example a mineral oil without additives such as wear-reducing agents, friction-reducing agents and/or corrosion-protective additives. As long as this mineral oil is fed between the effective surface 116 and the friction surface 121 a liquid film is present at least between a part of the friction surface 121 and effective surface 116 during brake use notwithstanding the high pressing force. As soon as the feed is stopped, the liquid film breaks down and produces a braking force or a holding force.

The resiliently mounted pressure member 130 can have a slide surface 134, which during brake use is slidingly supported on a rail surface 123, which faces away from the friction surface 121 and is parallel thereto, of the counter-member 120. The resiliently mounted pressure member 130 can also have a brake shoe. This brake shoe can be designed analogously to the brake shoe 111 and be supplied with fluid by means of a feed device. However, it can also be constructed like known brake shoes without fluid being feedable.

In order to control the feed of the fluid 154, the brake system 100 further comprises a control 161 which is connected by way of a signal line 164 with the valve 142 and controls this. The feed of fluid 154 can take place after a first sequence or braking process, the steps of which are stored in a storage medium 163 of the control 161. Since the behavior of the brake system 100 in the case of brake use is dependent on external influences such as the ambient temperature, air humidity, dust and dirt in the ambient air and the like the brake system 100 possibly comprises at least one sensor 162 and/or at least one connection for a sensor 162, which can detect measurement values of brake use and pass on these to the control 161. Such measurement values can be the deceleration of the elevator cage, the temperature of the effective surface, the brake travel of a preceding brake use, the position of the elevator cage at the start of the brake use, and the like. These measurement values can, for later use, be provided with time information and stored in the storage medium. The control can calculate from these measurement values the optimum feed (time instant and fluid quantity) and generate control signals for control of the valve 142.

Figure 2:
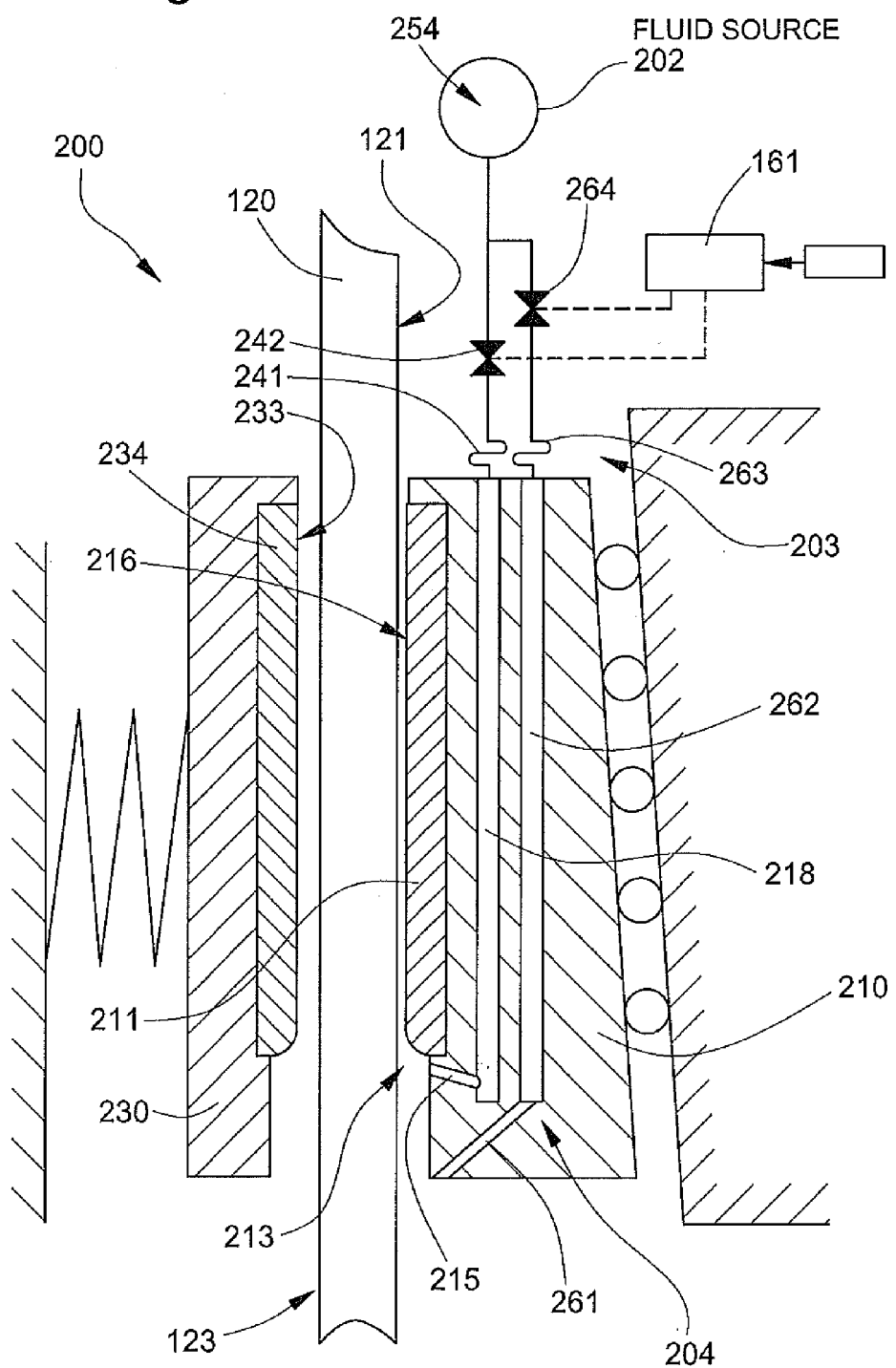
FIG. 2 shows, schematically, in plan view a brake system designed as a safety brake in a second embodiment, wherein the second embodiment differs from the first embodiment illustrated in FIG. 1 substantially in the feed device.

FIG. 2 schematically shows in sectional plan view a brake system 200, which is designed as a safety brake, in a second embodiment. The second embodiment differs from the first embodiment illustrated in FIG. 1 essentially in the design of the feed device 203. Accordingly, repeated description of parts which are described in FIG. 1 and also have the same reference numerals is dispensed with.

The feed device 203 illustrated in FIG. 2 requires another wedge body 210 and another brake shoe 211. Formed at the brake shoe 211 is an inlet region 213 which is similarly part of the feed device 203. The inlet region 213 has a suitable form, for example a curved surface, which is arranged in the edge region of the brake shoe 211 and goes over into the effective surface 216 thereof. As a consequence of a relative movement of the friction surface 121 with respect to the effective surface 216 a fluid 254, starting from the inlet region 213 and forming a fluid wedge between the effective surface 216 and the friction surface 121 can pass between the friction surface 121 and the effective surface 216 pressed against one another.

A feed duct 218, with which a first flexible line 241 is connected and connects the feed duct 218 with a first valve 242, is formed in the wedge body 210. The feed duct 218, the first flexible line 241 and the first valve 242 are similarly parts of the feed device 203. The feed duct 218 has an opening 215 which is directed towards the inlet region 213. The opening 215 possibly has a rectangular cross-section, the width of which extends orthogonally to the plane of the drawing and corresponds with the width of the brake shoe 211. The fluid 254, in the present example compressed air, is stored in a gas pressure vessel serving as fluid source 202. On opening of the first valve 242, fluid 254 flows through the first flexible line 241 into the feed duct 218 and from the opening 215 thereof towards the inlet region 213. As soon as the first valve 242 is closed, the fluid wedge between the friction surface 121 and the effective surface 216 breaks down and the brake system 200 brakes with maximum braking force.

The brake system 200 additionally comprises a cleaning device 204 by which the friction surface 121 of the counter-member 120 can be cleaned of oil, dust and dirt. The cleaning device 204 comprises a nozzle 261 with rectangular nozzle cross-section. The width of the nozzle cross-section similarly extends orthogonally with respect to the plane of the drawing in correspondence with the width of the brake shoe 211 and thus the width of the friction surface 121. The cleaning device 204 further comprises a supply duct 262 formed in the wedge body 210 and a second flexible line 263 connected with the supply duct 262. The second flexible line 263 is connected with a second valve 264, which is connected with the fluid source 202. As soon as the second valve 264 is opened, compressed air flows through the second flexible line 263 and the supply duct 262 in the nozzle 261. The compressed air flow flowing out of the nozzle 261 removes oil, dirt and dust from the friction surface 121 like a spatula blade. Both the first valve 242 and the second valve 264 are connected with the control 161.

The brake system of the second embodiment also comprises a pressure member 230. This includes a pressure-member brake shoe 234 with a pressure-member brake-shoe effective surface 233. As illustrated, the pressure-member brake shoe 234 does not comprise a feed device. However, this can also be connected by means of a feed device with the fluid source 102 in order to feed fluid between the pressure-member brake-shoe effective surface 233 and the rail surface 123 of the counter-member 120. However, also only one pressure-member cleaning device can be present, which is designed analogously to the cleaning device 204 and cleans the rail surface 123.

Figure 3:
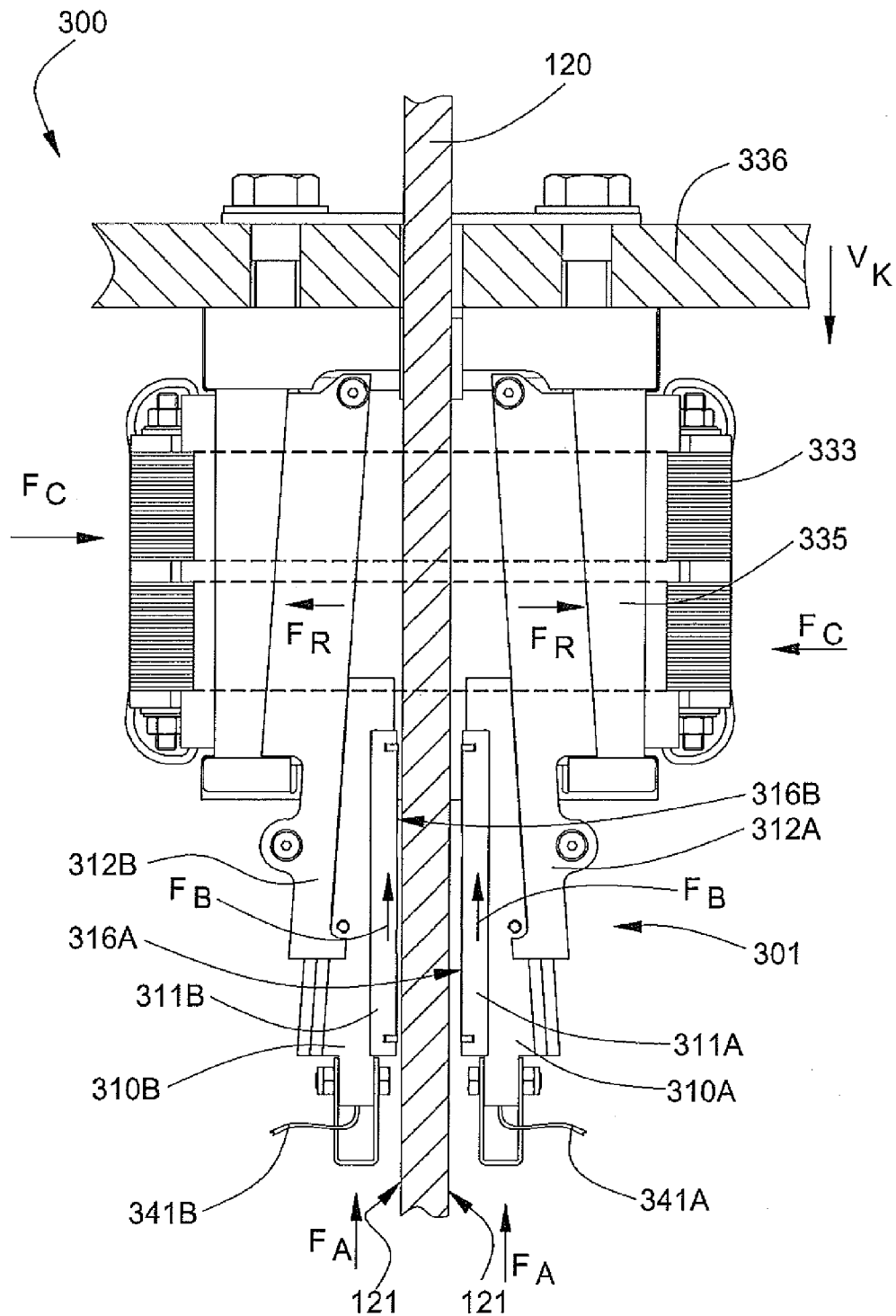
FIG. 3 shows in plan view a brake system, which is designed as a safety brake, in a third embodiment, wherein the brake system comprises a brake device, a fluid source and a feed device and the brake device includes two brake shoes in symmetrical arrangement.

FIG. 3 shows in plan view a brake system 300, which is designed as a safety brake, in a third embodiment, wherein the brake system 300 comprises a brake device 301, which contains in symmetrical arrangement two brake shoes 311A, 311B. The two brake shoes 311A, 311B are each fixedly connected with a respective wedge body 310A, 310B. The wedge bodies 310A and 310B are linearly guided by means of wedge guides 312A and 312B, respectively. The wedge guides 312A and 312B are connected together by a spring packet 333 of C-shaped design, wherein the middle part of the spring packet 333 is covered by the wedge guides 312A and 312B. The spring packet 333 is held in a cage 335 and the cage 335 is fixedly screw-connected with a support 336 of an elevator cage (not illustrated in detail).

If the elevator cage has in the movement direction $V_K$ an excessive speed relative to the counter-member 120, a trigger force $F_A$ is exerted on each of the wedge bodies 310A and 310B by a monitoring device (not illustrated), whereby these wedge bodies and the brake shoes 311A and 311B thereof are adjusted by way of the wedge shape towards the counter-member 120. The braking force $F_B$ acting during brake use between the friction surfaces 121 and the effective surfaces 316A, 316B of the brake shoes 311A, 311B has the same direction as the trigger force $F_A$ and draws the wedge bodies 310A, 310E and brake shoes 311A, 311B even more strongly towards the counter-member 120. Reaction forces $F_R$ thereby arise at the wedge guides 312A, 312B which lightly spread the spring packet 333, orthogonally to the movement direction $V_K$ of the elevator cage. The reaction forces $F_R$ are supported by the spring force $F_C$ of the spring packet 333. The brake shoes 311A, 311B and wedge bodies 310A, 310B can be designed analogously to the brake shoe and the brake body illustrated in FIG. 1 or 2. The feed of the fluid to the wedge bodies 310A, 310B takes place by way of the indicated flexible lines 341A, 341B, which are connected with a fluid source (not illustrated).

Figure 4:
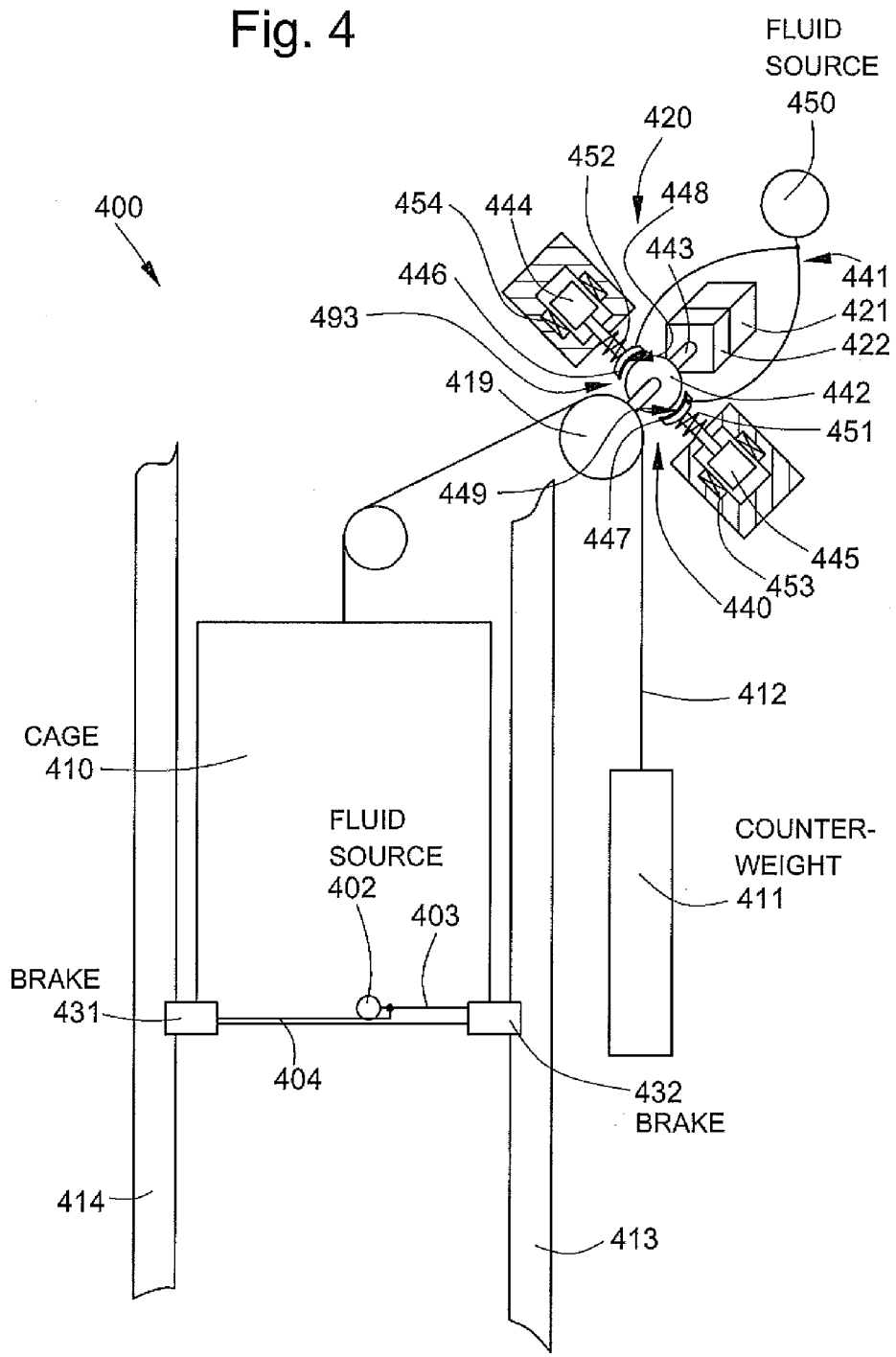
FIG. 4 shows, schematically, in plan view an elevator with an elevator cage, a counterweight, a drive unit and support means, which connects the cage with the counterweight and is guided by way of a drive pulley of the drive unit, wherein the drive unit includes a brake system, which is designed as an operating brake, with a feed device and the elevator cage has two brake systems, which are designed as safety brakes, with a feed device.

FIG. 4 shows schematically in plan view an elevator 400. This comprises an elevator cage 410, a counterweight 411, a drive unit 420 and a support means 412. The support means 412 connects the cage 410 with the counterweight 411 and is guided by way of a drive pulley 419 of the drive unit 420. The elevator cage 410 is guided at guide rails 413, 414. In addition, two brake systems designed as safety brakes 431, 432 are arranged in the floor region of the elevator cage 410. These can have a construction which corresponds with the safety brake illustrated in FIGS. 1 to 3.

The brake shoes, which are not illustrated in FIG. 4, of the safety brakes 431, 432 engage, during brake use, the guide rails 413, 414 serving as counter-member. As schematically indicated, a fluid source 402, which is connected by lines 403, 404 with the safety brakes 431, 432 and can supply fluid thereto during brake use, is arranged in the floor region of the elevator cage 410.

The drive unit 420 further includes a drive motor 421 with a speed step-down transmission 422 and a further brake system, which is designed as an operating brake 440, with a feed device 441. The operating brake 440 comprises a brake drum 442, which is arranged on a drive shaft 443, which drive shaft 443 connects the drive pulley 419 with the speed step-down transmission 422 and drive motor 421. The brake drum 442 has a friction surface 493 arranged at its circumference and serves as a counter-member of two brake-shoe bodies 444, 445. Each of these brake-shoe bodies 444, 445 has a brake shoe 446, 447 with an effective surface 448, 449 and during brake use is pressed by means of a resilient element 451, 452 against the brake drum 442. In order to release the operating brake 440 an electromagnet 453, 454, the magnetic force of which can overcome the spring force of the resilient element 451, 452, is associated with the each linearly guide brake-shoe body 444, 445. As long as voltage is applied to the electromagnets 453, 454 the operating brake 440 is, as illustrated, released. As soon as the voltage of the electromagnets 453, 454 is interrupted the brake shoe bodies 444, 445 together with the brake shoes 446, 447 thereof drop in, wherein the effective surfaces 448, 449 of the brake shoes 446, 447 rest on the friction surface 493.

The feed device 441 of the operating brake 440 is supplied by a fluid source 450. The feed device 441 and the brake shoes 446, 447 can be constructed analogously to the embodiments illustrated in FIG. 1 or 2, wherein the supply lines, passages and feed ducts are formed in the brake shoe bodies 444, 445. In addition, the effective surfaces 448, 449 can be matched at least in part to the radius of curvature of the friction surface 493 so that through feed of a fluid a load-bearing fluid film can form between the friction surface 493 and the effective surfaces 448, 449. Insofar as the fluid used is a liquid, the operating brake 440 can be arranged in a closed brake housing (not illustrated) so that the interior space of the closed brake housing forms the reservoir.

Figure 5:
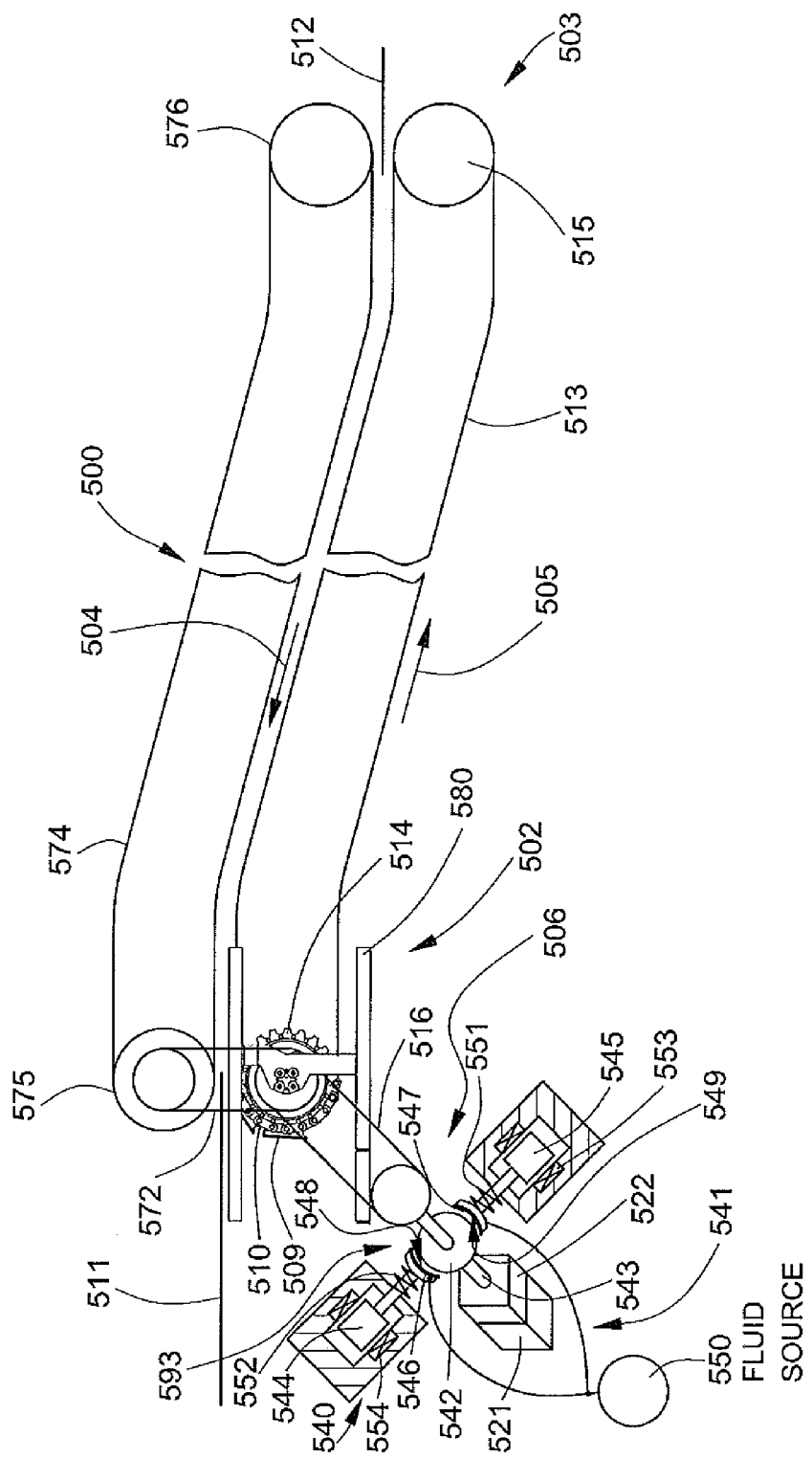
FIG. 5 shows, schematically, in plan view an escalator or a moving walkway with a step belt or plate belt, a handrail and a drive unit, wherein the drive unit includes a brake system, which is designed as a safety brake, with a feed device.

FIG. 5 shows in schematic illustration the moved principal components of an escalator or a moving walkway 500. An escalator 500 or a moving walkway 500 has a first deflecting region 502 and a second deflecting region 503, by way of the tread plates 511, 512 of which the users of the escalator 500 or the moving walkway 500 can enter or leave. Although illustrated only in the first deflecting region 502, both deflecting regions 502, 503 have a support structure 580, which is anchored in stationary position in the building structure of a building (not illustrated). Arranged between the two deflecting regions 502, 503 is a step belt 513 or plate belt 513 which includes at least one transport chain 510 and steps 509 or plates 509 arranged at the transport chain 510.

In the following, for ease of reading, only the escalator 500, the step belt 513 and steps 509 are mentioned, but the moving walkway 500, plate belt 513 and plates 509 are also intended in analogous sense, since at least some embodiments are equally suitable for escalators 500 and moving walkways 500. A chain wheel 514, 515 is rotatably arranged in each deflecting region 502, 503 per transport chain 510 which is present. The step belt 513 and consequently the transport chain 510 is designed to circulate and thus has a forward run 504 and a return run 505 illustrated by arrows. The rotational direction indication of the step belt 513 by arrows is only by way of example and shows the escalator 500 in upwardly transporting operational mode. The escalator 500 can also be operated in downwardly transporting operational mode. The deflection of the step belt 513 from the forward run 504 to the return run 505 or from the return run 505 to the forward run 504 takes place in the deflecting regions 502, 503 by the chain wheels 514, 515. A curved guide or a deflecting wheel, which deflects the step belt 513 analogously, can also be present in the second deflecting region 503 instead of the chain wheel 505.

Further moved principal components are a drive motor 521, a drive train 506 arranged between the drive motor 521 and the chain wheel 514 of the first deflecting region 502, and a co-running handrail 574. The handrail 574 is also designed to be circulating and is arranged between two deflecting wheels 575, 576. The deflecting wheel 575 arranged in the first deflecting region 502 is connected with the drive train 506 by means of a handrail drive 572. The drive train 506 comprises a gearwheel transmission 522, which is flange-mounted on the drive motor 521, and a chain transmission 516, so that the rotational movement of a drive shaft 543 arranged between the gearwheel transmission 522 and the chain drive 516 can be transmitted with speed reduction to the chain wheel 514 of the first deflecting region 502 and the deflecting wheel 575. The drive train 506 can also be connected with the chain wheel 515 of the second deflecting region 503 or both deflecting regions 502, 503 can each have a respective drive motor 521 and drive train 506.

In addition, the drive train 506 includes a brake system, which is designed as an operating brake 540, with a feed device 541. The operating brake 540 comprises a brake drum 542, which is arranged on the drive shaft 543. The brake drum 542 has a friction surface 593, which is arranged at its circumference, and serves as a counter-member of two brake-shoe bodies 544, 545. Each of these brake-shoe bodies 544, 545 comprises a brake shoe 546, 547 with an effective surface 548, 549 and during brake use is pressed by means of a resilient element 551, 552 against the brake drum 542. For release of the operating brake 540, an electromagnet 553, 554, the magnetic force of which can overcome the spring force of the resilient element 551, 552, is associated with each linearly guide brake-shoe body 544, 545. As long as voltage lies at the electromagnets 553, 554, the operating brake 540 is, as illustrated, released. As soon as the voltage supply of the electromagnets 553, 554 is interrupted the brake-shoe bodies 544, 545 together with the brake shoes 546, 547 thereof drop in, wherein the effective surfaces 548, 549 of the brake shoes 546, 547 rest against the friction surface 593.

The feed device 541 of the operating brake 540 is supplied by a fluid source 550. The feed device 541 and the brake shoes 546, 547 can be constructed analogously to the embodiments illustrated in FIGS. 1 and 2, wherein the supply lines, passages and feed ducts are formed in the brake-shoe bodies 544, 545. In addition, the effective surfaces 548, 549 can be matched at least partly to the radius of curvature of the friction surface 593 so that through feed of a fluid a load-bearing fluid film can form between the friction surface 593 and the effective surfaces 548, 549. Insofar as the fluid used is a liquid, the operating brake 540 can be arranged in a closed brake housing (not illustrated) so that the interior space of the closed brake housing forms the reservoir.

Although the disclosed technologies have been described by the illustration of specific exemplifying embodiments on the basis of an escalator and an elevator, some embodiments can also be used in a moving walkway and numerous further variants of embodiment can be created with knowledge of the present disclosure through combination of the features of the embodiments. Thus, a brake shoe can have at least one passage and inlet region, which can be supplied with fluid in common or separately by at least one feed device. In addition, in the case of safety brakes all conduits can be arranged outside the wedge body. The fluid source and the feed device can also be arranged in the brake housing. The fluid source of a safety brake is, however, possibly arranged to be easily reachable at the cage so that this can be simply and quickly filled with fluid.

In addition, in the case of operating brakes use can also be made, as counter-member, of a brake disc instead of a brake drum, wherein the brake caliper is for the purpose of feed of fluid to be provided with appropriate brake shoes and a feed device, which can be connected with a fluid source. In addition, each described brake system can be equipped with a control valve and a control. All of these combinations are embraced by the scope of protection.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. We therefore claim as our invention all that comes within the scope and spirit of these claims.

We claim:

1. A brake system of an elevator, an escalator, or a moving walkway, the brake system comprising:
    a brake device, the brake device comprising a brake shoe, the brake shoe comprising an effective surface, the effective surface being configured to be pressed against a friction surface of a counter member during use, the friction surface moving or being movable relative to the effective surface; and
    a feed device coupled to a fluid source, the feed device being configured to control feed of a fluid from the fluid source between the effective surface and the friction surface when the effective surface is pressed against the friction surface, wherein a sliding friction between the effective surface and the friction surface is influenced by the feed of the fluid to provide a predetermined deceleration profile in order to control a transition from the sliding friction to an adhesive friction.

2. The brake system of claim 1, the feed device comprising a passage formed in the brake shoe, the passage comprising an inlet coupled to the fluid source and an outlet coupled to the effective surface, the fluid source being configured to generate sufficient fluid pressure to feed the fluid between the effective surface and the friction surface when the effective surface and the friction surface are pressed against each other.

3. The brake system of claim 2, the effective surface of the brake shoe comprising bores or grooves, the outlet being positioned between the bores or between the grooves.

4. The brake system of claim 2, the passage being a first passage, the feed device further comprising a second passage formed in the brake shoe, the first and second passages being connected to the fluid source by a common supply duct.

5. The brake system of claim 1, the feed device comprising:
    an inlet region formed at the brake shoe; and
    a feed line, the feed line comprising an opening directed into the inlet region, the feed line being connected with the fluid source to pass the fluid through the opening and into the inlet region.

6. The brake system of claim 1, further comprising the fluid source, the fluid source comprising a conveying device.

7. The brake system of claim 6, the conveying device comprising a pump.

8. The brake system of claim 6, the conveying device comprising a pressure cylinder.

9. The brake system of claim 6, the conveying device comprising a gas pressure container.

10. The brake system of claim 1, further comprising:
    a control valve; and
    a control, the control being configured to control the control valve for regulation of the feed of the fluid.

11. The brake system of claim 10, further comprising a sensor for detecting a change of movement of the friction surface relative to the effective surface.

12. The brake system of claim 10, the control valve being configured to generate a pulsating fluid flow in response to signals from the control.

13. The brake system of claim 1, the fluid comprising a technical gas.

14. The brake system of claim 13, the technical gas comprising air or a liquid.

15. The brake system of claim 13, the liquid comprising a mineral oil without high-pressure additives.

16. The brake system of claim 1, the brake system being an operating brake, the brake system further comprising a brake drum or a brake disc as the counter member.

17. The brake system of claim 1, the brake system being a safety brake device configured to brake against a guide rail or against a separately arranged brake rail.

18. The brake system of claim 1, further comprising a cleaning device, the cleaning device being mounted upstream of the brake shoe and being configured to clean the counter member.

19. A method of braking an elevator cage of an elevator, a step belt of an escalator, or a plate belt of a moving walkway, the method comprising:
    activating a brake system, the brake system comprising,
    a brake device, the brake device comprising a brake shoe, the brake shoe comprising an effective surface, the effective surface being configured to be pressed against a friction surface of a counter member during use, the friction surface moving or being movable relative to the effective surface, and
    a feed device coupled to a fluid source; and
    changing a sliding friction between the effective surface and the friction surface when the effective surface is pressed against the friction surface by feeding a predetermined amount of the fluid from the fluid source between the effective surface and the friction surface using the feed device to provide a predetermined deceleration profile in order to control a transition from the sliding friction to an adhesive friction.

20. The method of claim 19, the brake system further comprising a control with a computer unit and a memory unit, the memory unit storing time-dependent brake use data, the method further comprising calculating control variables for a next braking based on the time-dependent brake use data.

* * * * *